United States Patent
Huijnen et al.

(10) Patent No.: US 9,857,182 B2
(45) Date of Patent: Jan. 2, 2018

(54) NAVIGATION DEVICE AND METHOD FOR PROVIDING PARKING PLACE AVAILABILITY

(75) Inventors: Mark Huijnen, Rotterdam (NL); Frederic Bruneteau, Brussels (BE); Jeroen Trum, Eindhoven (NL)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 382 days.

(21) Appl. No.: 12/736,691

(22) PCT Filed: Jun. 24, 2009

(86) PCT No.: PCT/EP2009/057880
§ 371 (c)(1),
(2), (4) Date: Jan. 5, 2011

(87) PCT Pub. No.: WO2009/156428
PCT Pub. Date: Dec. 30, 2009

(65) Prior Publication Data
US 2011/0109480 A1    May 12, 2011

Related U.S. Application Data

(60) Provisional application No. 61/129,413, filed on Jun. 25, 2008.

(51) Int. Cl.
*B60Q 1/48*    (2006.01)
*G01C 21/34*    (2006.01)
(Continued)

(52) U.S. Cl.
CPC ......... *G01C 21/34* (2013.01); *G01C 21/3476* (2013.01); *G01C 21/3614* (2013.01);
(Continued)

(58) Field of Classification Search
CPC ........... G01C 21/3476; G01C 21/3614; G01C 21/3685; G08G 1/091; G08G 1/096716;
(Continued)

(56) References Cited

U.S. PATENT DOCUMENTS 5,910,782 A    6/1999    Schmitt et al.
5,987,378 A *  11/1999   Schipper et al. ............. 701/526
(Continued)

FOREIGN PATENT DOCUMENTS

CN    1573293 A    2/2005
CN    1737871 A    2/2006
(Continued)

OTHER PUBLICATIONS

International Search Report dated Oct. 2, 2009 for International Application No. PCT/EP2009/058005.
(Continued)

*Primary Examiner* — Ryan Sherwin

(57) ABSTRACT

Embodiments of the present invention relate to a device including a processor, a location determining device to determine a geographical location of the device and a communication device to wirelessly transmit data. In at least one embodiment, the processor is arranged to determine when the device is located in a vehicle which has vacated a parking place and, in response, to transmit a message via the communication device indicating a location of the parking place.

15 Claims, 11 Drawing Sheets

(51) Int. Cl.
*G01C 21/36* (2006.01)
*G08G 1/09* (2006.01)
*G08G 1/0967* (2006.01)
*G08G 1/0968* (2006.01)
*G08G 1/0969* (2006.01)
*G08G 1/14* (2006.01)

(52) U.S. Cl.
CPC ..... *G01C 21/3682* (2013.01); *G01C 21/3685* (2013.01); *G08G 1/091* (2013.01); *G08G 1/0969* (2013.01); *G08G 1/09675* (2013.01); *G08G 1/096716* (2013.01); *G08G 1/096775* (2013.01); *G08G 1/096827* (2013.01); *G08G 1/096844* (2013.01); *G08G 1/096861* (2013.01); *G08G 1/096883* (2013.01); *G08G 1/096888* (2013.01); *G08G 1/141* (2013.01)

(58) Field of Classification Search
CPC ............... G08G 1/09675; G08G 1/141; G08G 1/096827; G08G 1/096844; G08G 1/096861; G08G 1/096883; G08G 1/096888; G08G 1/0969; G08G 1/096775
USPC ..... 340/932.2, 901–905, 933, 938, 988–996; 705/13; 455/99, 456.1–456.6
See application file for complete search history.

(56) References Cited

U.S. PATENT DOCUMENTS

| | | | |
|---|---|---|---|
| 6,085,090 A * | 7/2000 | Yee et al. | ................... 455/440 |
| 6,192,312 B1 * | 2/2001 | Hummelsheim | ............. 701/118 |
| 6,236,337 B1 | 5/2001 | Beier et al. | |
| 6,266,609 B1 | 7/2001 | Fastenrath | |
| 6,411,895 B1 | 6/2002 | Lau et al. | |
| 6,640,188 B2 * | 10/2003 | Hashida | ................... 701/446 |
| 6,650,250 B2 | 11/2003 | Muraki | |
| 6,650,999 B1 * | 11/2003 | Brust et al. | ................. 701/517 |
| 6,694,259 B2 * | 2/2004 | Curbow | ............. G01C 21/26 340/468 |
| 6,946,974 B1 | 9/2005 | Racunas, Jr. | |
| 7,096,100 B2 | 8/2006 | Arata | |
| 7,200,394 B2 | 4/2007 | Aoki et al. | |
| 7,619,542 B2 | 11/2009 | Riesco Prieto et al. | |
| 7,768,426 B2 | 8/2010 | Groft | |
| 8,175,803 B2 | 5/2012 | Caraballo | |
| 2002/0169552 A1 | 11/2002 | Hashida | |
| 2005/0195095 A1 | 9/2005 | Kato | |
| 2005/0239479 A1 * | 10/2005 | Bednasz | ........... H04M 1/72572 455/456.1 |
| 2006/0111835 A1 * | 5/2006 | Baker et al. | ................. 701/207 |
| 2007/0038362 A1 | 2/2007 | Gueziec | |
| 2007/0040701 A1 | 2/2007 | Browne et al. | |
| 2007/0198181 A1 | 8/2007 | Shimamura | |
| 2008/0048885 A1 | 2/2008 | Quinn | |
| 2009/0091477 A1 | 4/2009 | McCall et al. | |
| 2009/0150073 A1 | 6/2009 | Caraballo | |
| 2011/0099126 A1 | 4/2011 | Belani et al. | |
| 2011/0140922 A1 | 6/2011 | Levy et al. | |

FOREIGN PATENT DOCUMENTS

| | | |
|---|---|---|
| DE | 102006005059 A1 | 8/2007 |
| EP | 1058089 A2 | 12/2000 |
| EP | 1397012 A2 | 3/2004 |
| EP | 1734492 A1 | 12/2006 |
| EP | 1 742 191 | 1/2007 |
| EP | 1906375 A2 | 4/2008 |
| EP | 1742191 B1 | 7/2011 |
| GB | 2421622 A | 6/2006 |
| JP | 2007026424 A | 2/2007 |
| RU | 2271573 C1 | 3/2006 |
| RU | 2305327 C2 | 8/2007 |
| WO | 2007083997 A1 | 7/2007 |
| WO | 2008045157 A2 | 4/2008 |

OTHER PUBLICATIONS

International Search Report dated Oct. 2, 2009 for International Application No. PCT/EP2009/050360.
International Search Report dated Oct. 5, 2010 for International Application No. PCT/EP2009/057880.

\* cited by examiner

NAVIGATION DEVICE AND METHOD FOR PROVIDING PARKING PLACE AVAILABILITY

This is a National Phase of PCT Patent Application No. PCT/EP2009/057880, filed on Jun. 24, 2009, which claims priority under 35 U.S.C. §365(c) and 119(e) to U.S. Provisional Application No. 61/129,413, filed on Jun. 25, 2008, the contents of each of which are hereby incorporated herein by reference in their entirety.

FIELD OF THE INVENTION

This invention relates to navigation devices and to methods for providing parking place information. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

Whilst navigation devices are able to locate car parks, which are often stored in or alongside map data as points of interest, often car parks, especially in busy cities, may be full. Furthermore, available on-street parking spaces are particularly difficult to find, especially in busy cities.

It is an aim of the present invention to address this problem, in particular to attempt to assist users in finding car parking spaces.

SUMMARY OF THE INVENTION

In pursuit of this aim, a presently preferred embodiment of the present invention provides: a device, comprising: a processor; location determining means for determining a geographical location of the device; and communication means for wirelessly transmitting data; wherein the processor is arranged to determine when the device is located in a vehicle which has vacated a parking place and, in response, to transmit a message via the communication means indicating a location of the parking place. A further preferred embodiment of the invention provides a method for use in a navigation device, comprising: determining when a vehicle in which the navigation device is located vacates a parking place; and wirelessly transmitting a parking place available message indicating a location of the parking place.

Another embodiment of the invention provides a system, comprising: at least one in-vehicle device for determining a current location of a vehicle carrying the device and wirelessly transmitting data, characterised in that the in-vehicle device is arranged to determine the vehicle leaving a parking place and, in response, to transmit a message indicating a location of the parking place; and at least one navigation device comprising a parking place notification module, wherein the navigation device is arranged to wirelessly receive a message indicating the location of the parking place and, in response, the parking place notification module is arranged to either display on a display device an indication of the location of the parking place, or to select as a destination location the location of the parking place.

Another embodiment of the present invention relates to a navigation device comprising a processor, a receiver for wirelessly receiving data and a display (240); characterised in that the receiver is arranged to receive a parking place available message indicating a location of an available parking place; and the navigation devices comprises a parking place notification module arranged to either display on a display device an indication of the location of the parking place, or to select as a destination location the location of the parking place.

A further embodiment of the present invention relates to a method for use in a navigation device, characterised by: receiving a message indicating a location of an available parking place; either displaying on a display device (240) an indication of the location of the parking place, or selecting as a destination location the location of the parking place.

Yet another embodiment of the present invention relates to computer software comprising one or more software modules operable, when executed in an execution environment, to cause a processor to receive a message indicating a location of an available parking place; and either display on a display device (240) an indication of the location of the parking place, or select as a destination location the location of the parking place.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
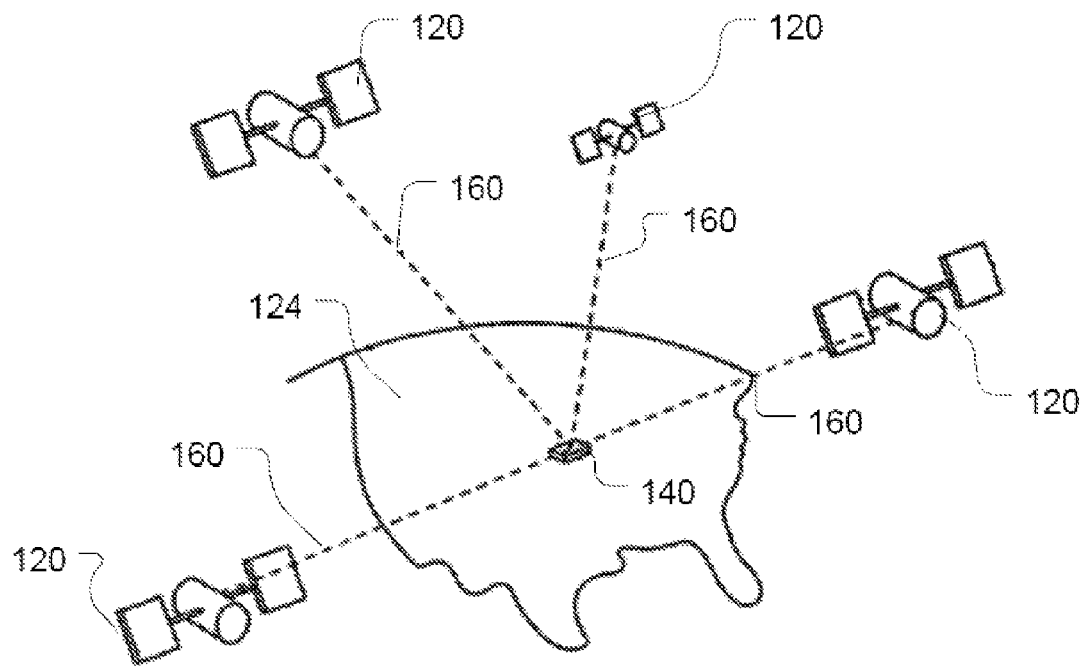
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
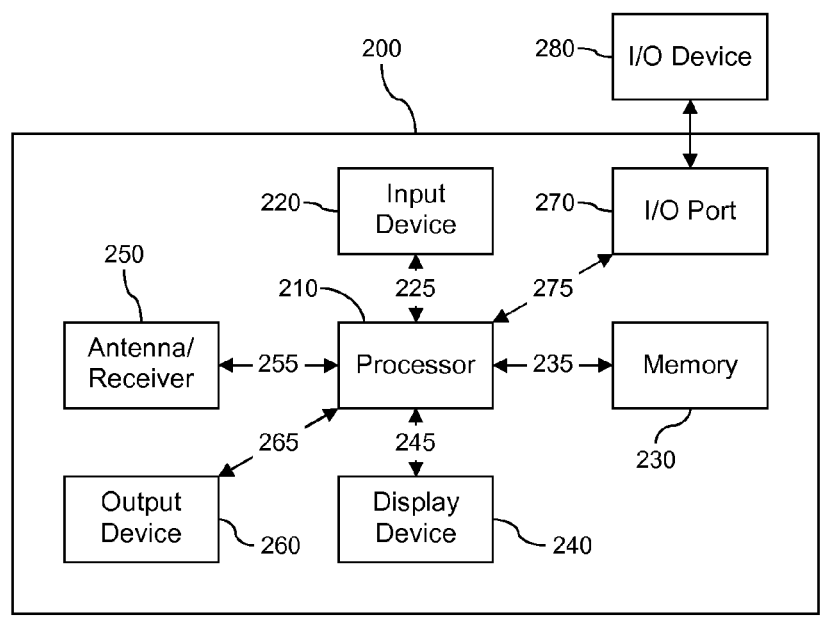
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an ear piece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
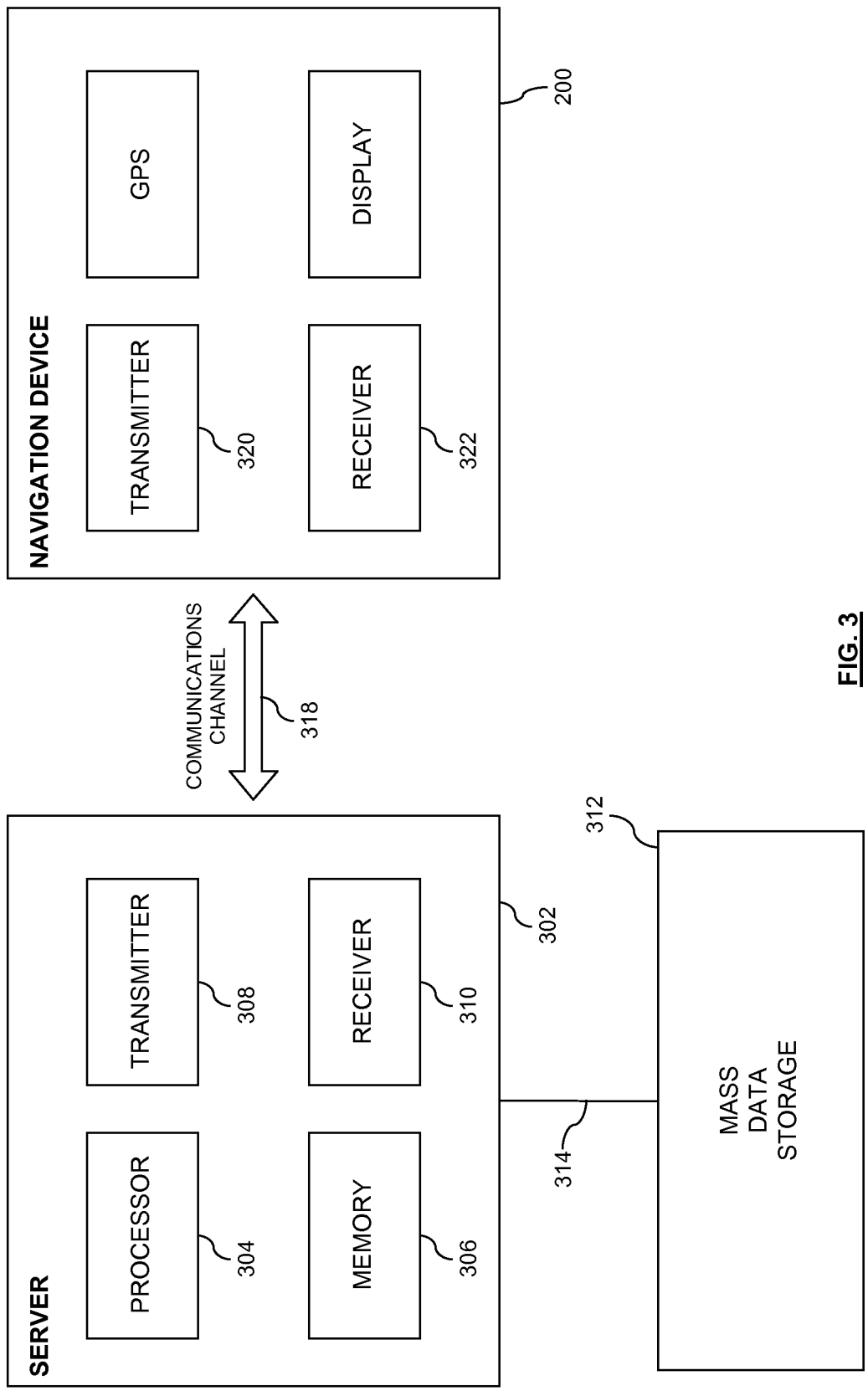
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
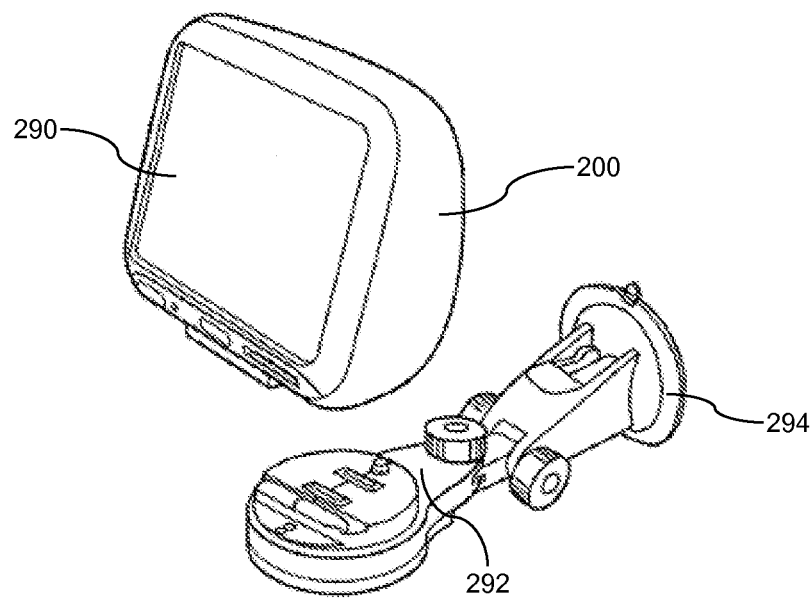
FIGS. 4A and 4B are illustrative perspective views of a navigation device.
Figure 4B:
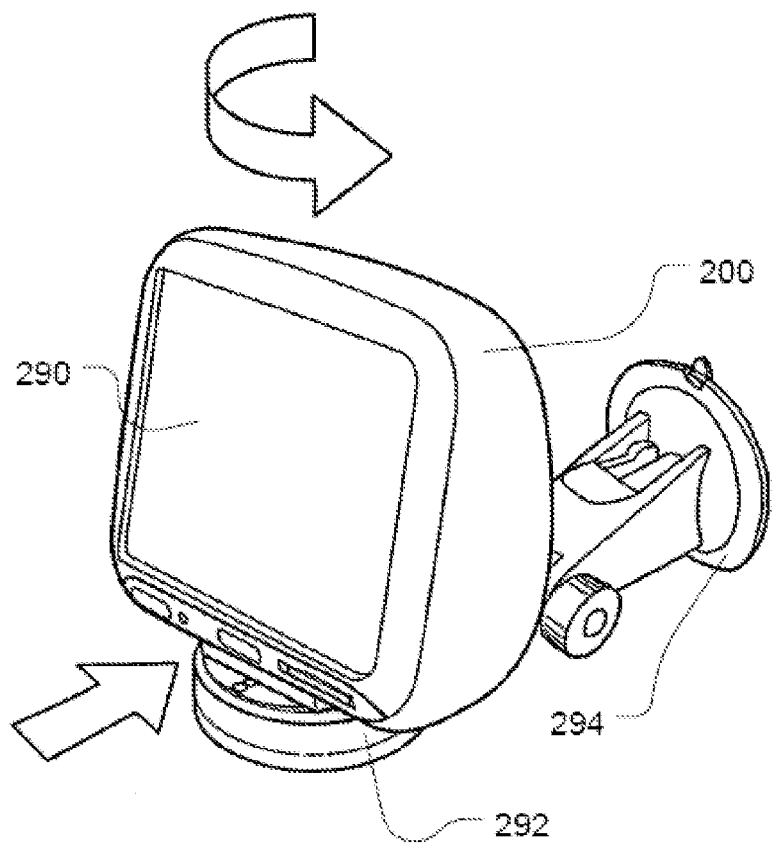

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Figure 5:
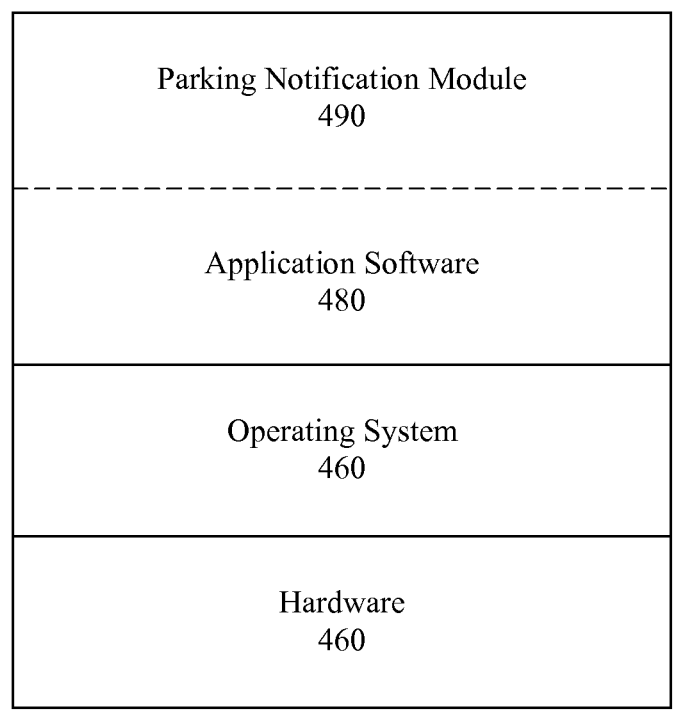
FIG. 5 is a schematic representation of the software employed by the navigation device.

Referring now to FIG. 5 of the accompanying drawings, the memory resource 230 stores a boot loader program (not shown) that is executed by the processor 210 in order to load an operating system 470 from the memory resource 230 for execution by functional hardware components 460, which provides an environment in which application software 480 can run. The operating system 470 serves to control the functional hardware components 460 and resides between the application software 480 and the functional hardware components 460. The application software 480 provides an operational environment including the GUI that supports core functions of the navigation device 200, for example map viewing, route planning, navigation functions and any other functions associated therewith. In accordance with the preferred embodiment of the present invention, part of this functionality comprises a parking notification module 490, the function of which will now be described in detail in connection with the following figures.

A parking notification module 490 of an in-vehicle device is arranged to determine when the vehicle vacates, or has recently vacated, a parking place. When the parking place has been vacated, the parking notification module 490 is arranged to notify at least one navigation device 200 of the parking place vacation. The notification may be communicated to a server 302 via the communications channel 318, or may be communicated directly to one or more navigation devices 200, for example via a wireless signal. The notification may be sent to all navigation devices 200 communicative with the in-vehicle device transmitting the notification, either via the server 302 or directly. Alternatively, the notification may be sent to a subset of the communicative navigation devices 200. The subset may be those navigation devices 200 within a predetermined distance of the device transmitting the notification. Alternatively, the subset may be one or more predetermined navigation devices 200. In some embodiments, the in-vehicle device including the parking notification module is a navigation device 200. However, the in-vehicle device may also be another type of device, such as a vehicle monitoring device, a road-toll monitoring device, or any other device capable of monitoring or determining the vehicle's location and having access to a communications resource. The in-vehicle device may also be a portable device located in the vehicle, such as a portable navigation device.

In some embodiments, the parking notification module 490 operatively notifies a user of available parking places. The parking notification module 490 may operatively provide a visual indication of a location of a recently vacated parking place on a map which is displayed on the display device 240. In some embodiments the visual indication may comprise an indication of how recently the parking place was vacated. The indication may be in the form a textual indication and/or a colour indicating how recently the parking place became available. Alternatively or additionally, the parking place notification module 490 may select as a destination location the location of the recently vacated parking place. The parking place notification module 490 may select a location of the recently vacated parking place as the destination location when it is within a predetermined distance of a current location of the navigation device.

Embodiments of the present invention will now be described with reference to FIGS. 6 to 12 in which an in-vehicle device in the form of a navigation device comprises the parking notification module 490. However, it will be realised that the in-vehicle device may be any device capable of determining its location and wirelessly communicating information to another device external to the vehicle.

Figure 6:
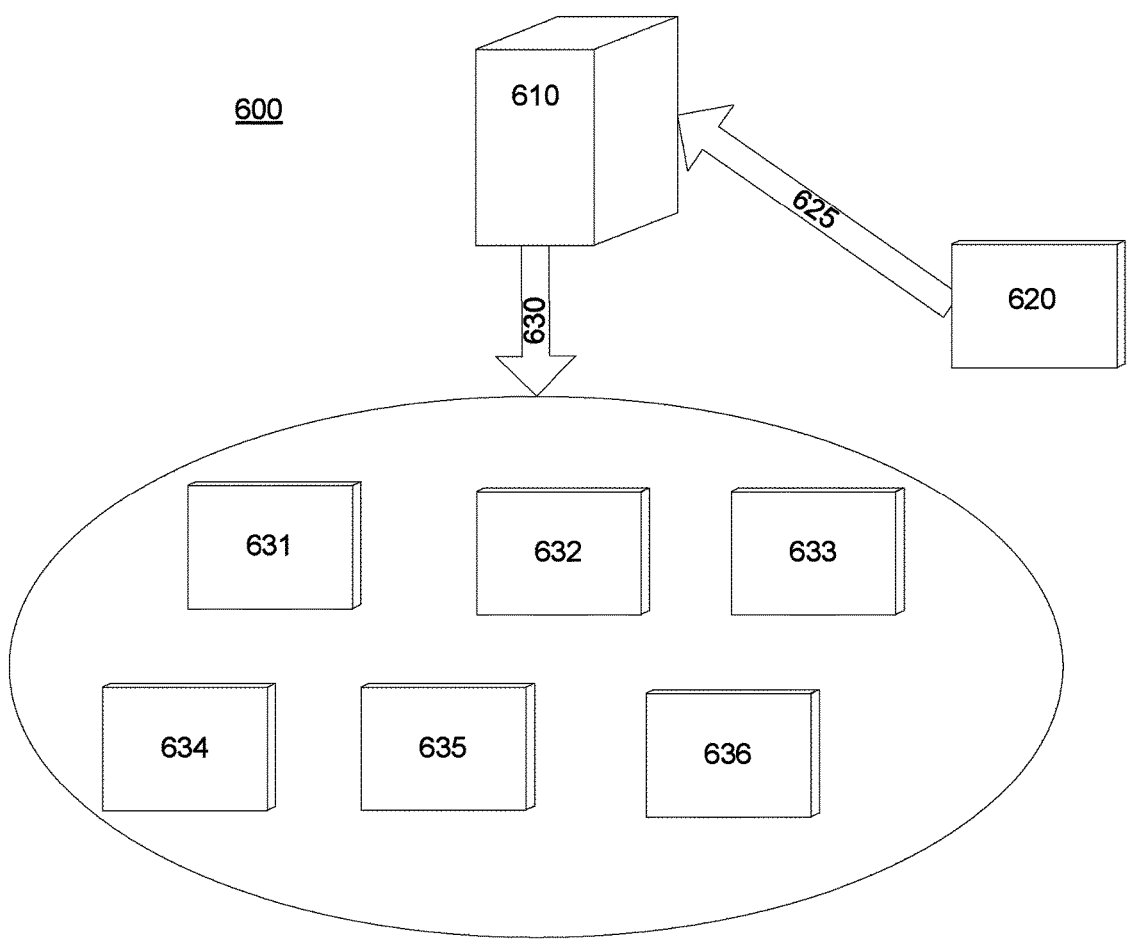
FIG. 6 is a schematic diagram illustrating a system and the operation thereof according to an embodiment of the present invention.

FIG. 6 illustrates a system 600 according to an embodiment of the present invention. The system comprises a server 610 communicatively coupled to a first navigation device 620 via a communications channel as described in detail above. The server 610 is also communicatively coupled to one or more additional navigation devices 631-636. The first navigation device 620 comprises a parking notification module 490 and may be identical to those navigation devices 631-636 forming the group of navigation devices. The parking notification module 490 of the first navigation device 620 is arranged to determine when the first navigation device 620 is located within a vehicle which is leaving, or has recently left, a parking space. The determination of when the navigation device 620 is located in a vehicle which is leaving a parking space may be achieved in a number of different ways, as will be described.

Upon receiving the parking place available message 625 from the navigation device 620, the server 610 is arranged to notify the group of navigation devices 631-636 of the parking place that has become available by sending a parking place available message 630 to each navigation device 631-636 via the communications channel 318. The parking place notification message 630 may be a copy of that generated by the first navigation device 620 and received by the server 610. The parking place available message 630 sent to the navigation devices 631-636 indicates the location of the parking place and may also indicate the time at which it became available.

In response to receiving the parking place available notification message 630, each of the navigation devices 631-636 stores the information contained in the received parking place notification message in memory 230. In some embodiments, if the location of the available parking place is more than a predetermined distance from the current location of the navigation device 631-636, then the parking place available message 630 may be discarded by the navigation device. If a user subsequently activates the parking mode of the navigation device 631-636, the parking notification module 490 is arranged to display an indication of available parking places in the vicinity of the navigation device. If the parking notification module 490 is configured to only display indications of parking places which became available within a predetermined amount of time, the information in the parking place available message indicating the time at which each parking place became available may be used to identify those parking places to be indicated on the display device 240.

Whilst the embodiment described with reference to FIG. 6 includes a server 610 through which parking place available messages are distributed to navigation devices 631-636, embodiments of the present invention may be envisaged which do not require a server 610. In these embodiments, each navigation device 620, 631-636 is capable of wirelessly transmitting and receiving data to/from other navigation devices 620, 631-636. For example, each navigation device may include a WiMax transmitter/receiver unit. In this case, the first navigation device 620 is arranged to transmit the parking place available message directly to other navigation devices 631-636 in the local area using the transmitter/receiver unit. Advantageously, this ensures that parking place available messages 630 are only communicated to navigation devices 631-636 which are relatively local to the parking place.

Figure 7:
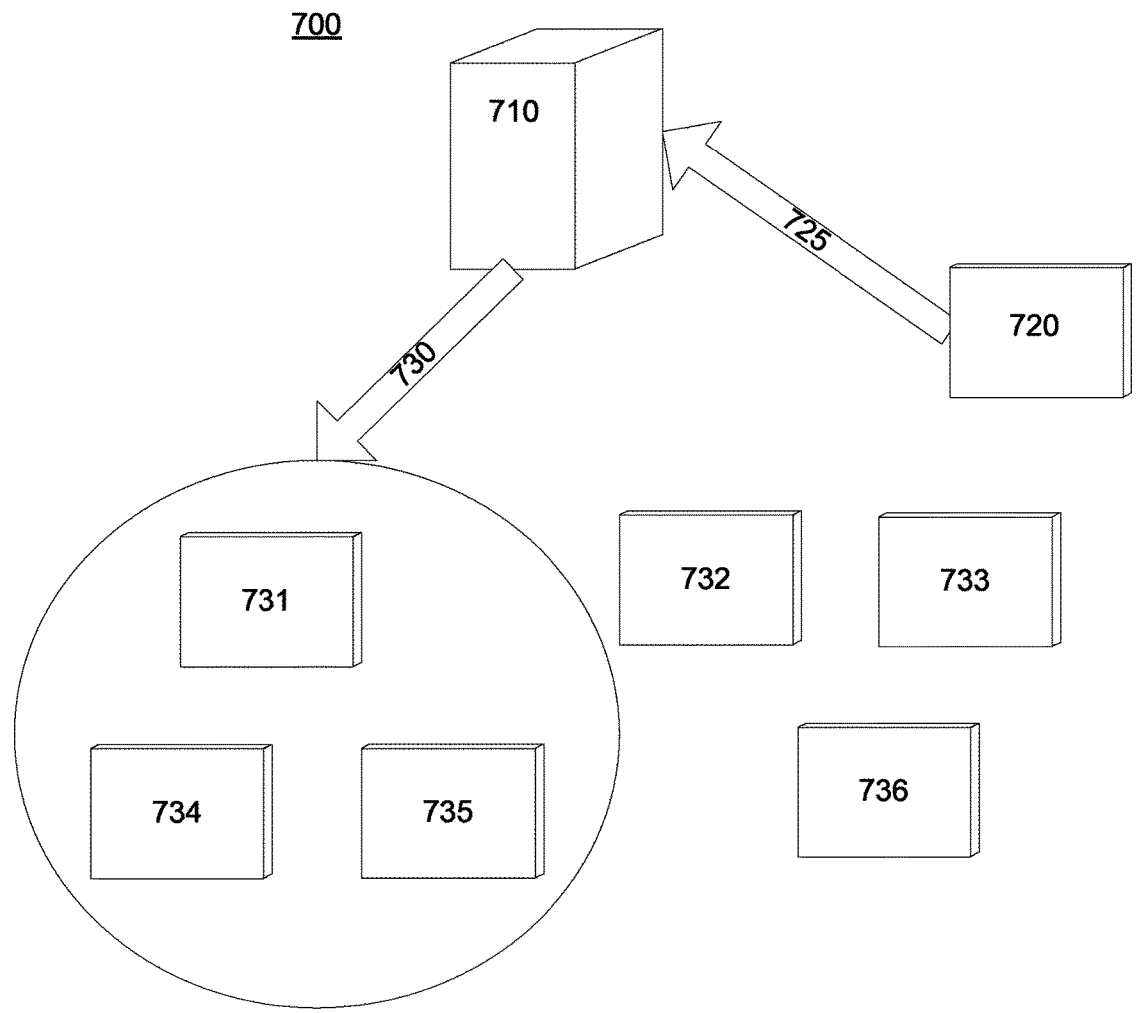
FIG. 7 is a schematic diagram illustrating the operation of a system according to an embodiment of the present invention.

FIG. 7 shows a system comprising a server 710, a first navigation device 720, a communications channel 725 between the server and the first navigation device 720, and a plurality of other navigation devices 731-736 in communication with server via communications channel 730, as previously described with reference to FIG. 6. As previously described, the parking place notification module 490 of the first navigation device 720 is arranged to determine when the navigation device 820 is located in a vehicle which leaves a parking place and to send a parking place available message to the server 710. However, in these embodiments, only some of the navigation devices 731-736 communicatively coupled to the server 710 are notified of the available parking place.

In one embodiment, the server 710 determines which of the plurality of navigation devices 731-736 are sent the parking place available message 730, based upon a current location of each navigation device 731-736. Each of the group of navigation devices 731-736 is arranged to periodically communicate location information indicating their current location to the server 710 to, for example, enable the provision of traffic information relevant to the vicinity of each navigation device 731-736. Using the location information, the server 710 is arranged to determine a relative distance between each of the navigation devices 731-736 and the location of the parking place identified in the parking place available message received by the server 710 from the first navigation device 720. If the distance is less than a predetermined distance, then the server 710 is arranged to transmit a parking place available message to that navigation device, such that only those navigation devices within a predetermined distance of the parking place are notified. As shown in FIG. 7, navigation devices 731, 734 and 735 have been determined by the server 710 to be within the predetermined distance of the available parking place and thus the server 710 communicates the parking place available message 730 to only those navigation devices, but not the other navigation devices 732, 733, 736 which are more than the predetermined distance from the available parking place.

Again referring to FIG. 7, further embodiments of the present invention in which the parking place available message 730 is transmitted by the server 710 to only a subset of navigation devices 731-736 will now be described.

In one embodiment, the parking place available message 725 transmitted by the first navigation device 720 to the server 710 further comprises a private parking group identification number (PPGID). The PPGID is used by the server 710 to identify one or more navigation devices to which the parking place available message 730 should be sent by the server 710. The server 710 stores a navigation device group database identifying one or more navigation devices with a PPGID. Upon receiving the parking place available message 725 from the first navigation device 720, the server 710 is arranged to determine the navigation devices belonging to that PPGID from the navigation device group database and to transmit the parking place available message to only those navigation devices 731, 734, 735. This is useful, for example, where the parking place is a private parking place used by a plurality of users. Once one user leaves the private parking place, its availability is only communicated to other legitimate users of the parking place. Map data stored in the first navigation device 720 may identify the parking place as private and, in response to the vehicle in which the first navigation device 720 is located leaving the private parking place, the parking place notification module 490 is arranged to transmit the parking place available message containing the PPGID appropriate to that parking place.

In an alternative embodiment, the first navigation device 720 is arranged to transmit the parking place available message 725 to the server 710 irrespective of Whether the parking place is private, as in previous embodiments. The server 710 stores map data in memory 306 which indicates a location private parking places and one or more navigation devices 731, 734, 735 corresponding to each parking place. Upon receiving the parking place available message 725 from the first navigation device 720, the server 710 is arranged to determine from the stored map data whether the location indicated in the message 725 corresponds to a private parking place. If the location is a private parking place, the parking place available message 725 is transmitted by the server 710 only to those navigation devices 731, 734, 735 corresponding to that private parking place.

Figure 8:
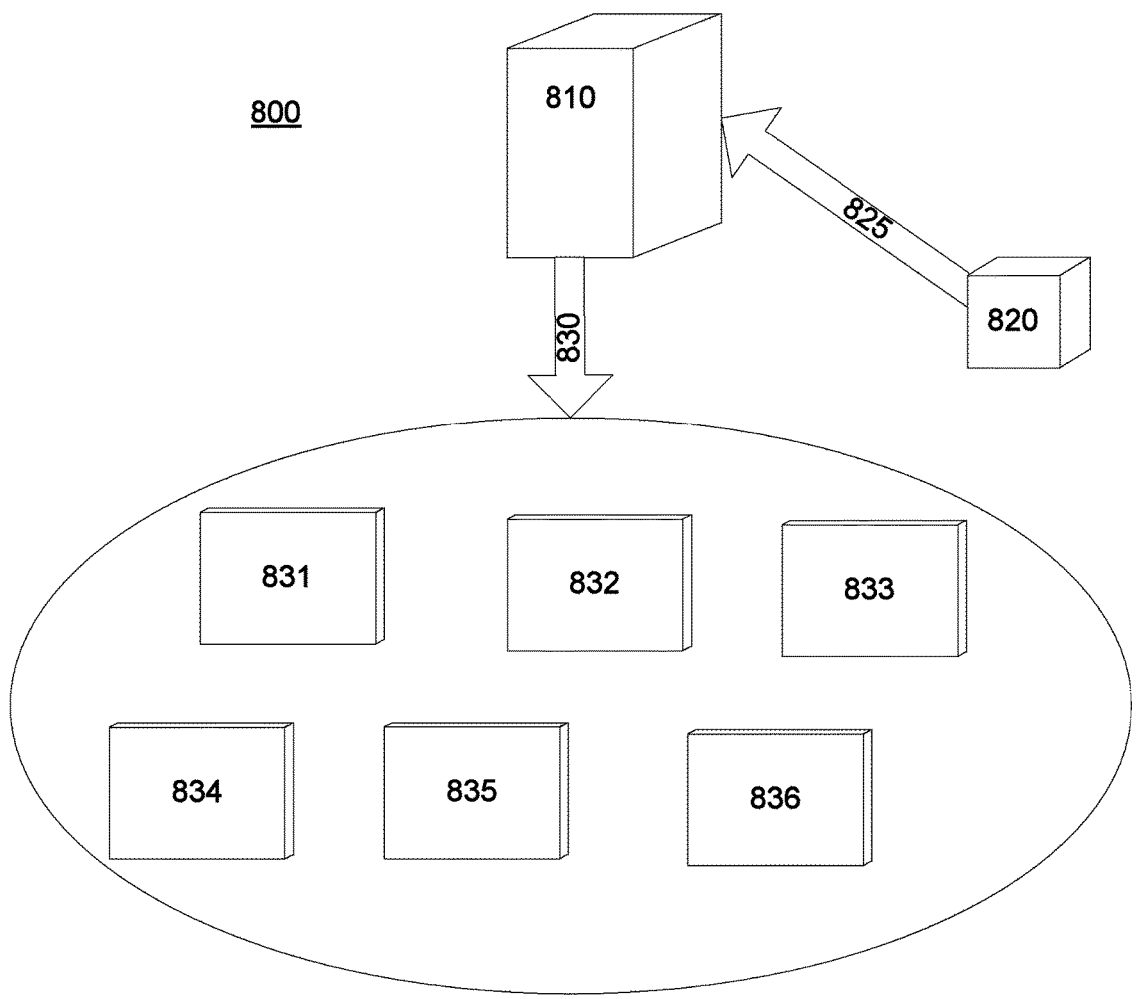
FIG. 8 is a schematic diagram illustrating a system and the operation thereof according to an embodiment of the present invention.

FIG. 8 shows a further embodiment of the present invention, similar to that shown in FIG. 6. A system 800 comprises a server 810, an in-vehicle device 820 and a plurality of navigation devices 831-936. The in-vehicle device 820 is a device capable of determining its current location and transmitting a parking place available message 825 to the server 810. Such an in-vehicle device may, for example, be a vehicle security device, such as that used for alerting a vehicle owner or security service of the vehicle's location when it has been stolen, or for road charging purposes. The device 820 is arranged to determine when the vehicle in which it is mounted leaves a parking place in the same way as the parking notification module 490 previously described and to transmit the parking place notification message 825 to the server 810. The server 810, upon receiving the notification message 825 from the device 820, is arranged to transmit a parking place notification message 830 to either all communicatively coupled navigation devices 831-836 as shown in FIG. 8, or to only some of the navigation devices as previously described with reference to FIG. 7.

Figure 9:
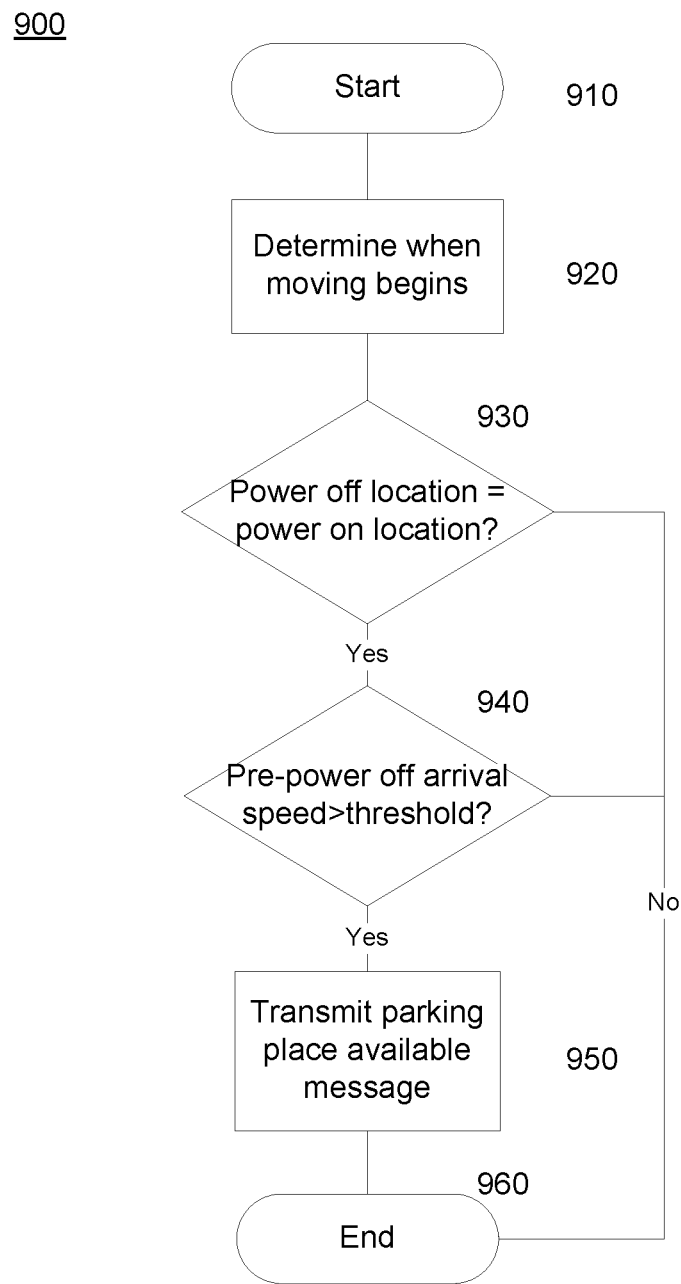
FIG. 9 is a method according to an embodiment of the present invention.
Figure 10:
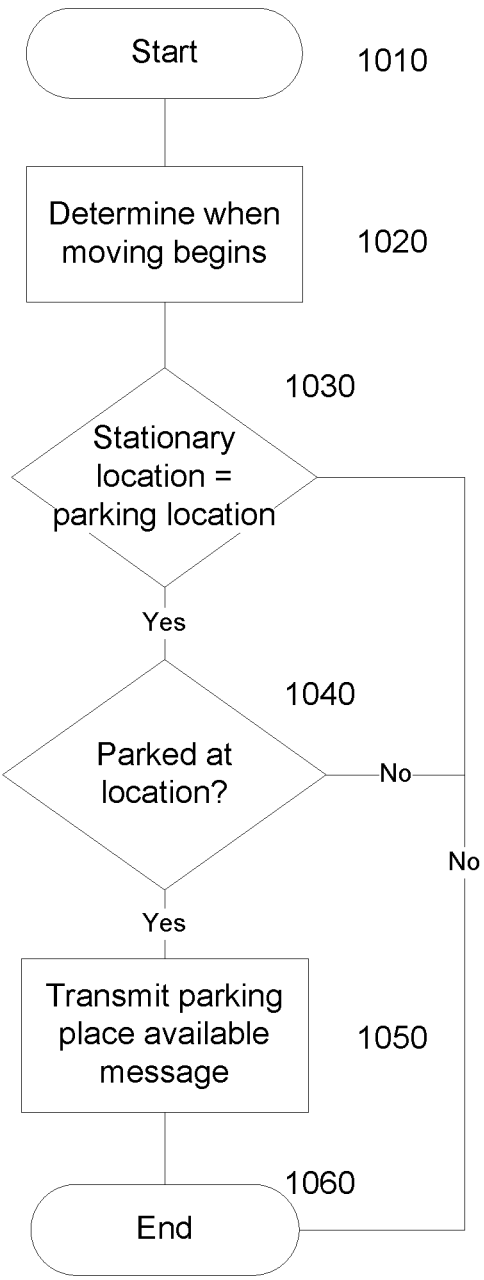
FIG. 10 is a method according to a further embodiment of the present invention.

Methods of the parking notification module 490 determining when a vehicle has vacated a parking place will now be described with reference to FIGS. 9 and 10.

A first embodiment of the parking notification module 490 is arranged to determine that the navigation device 620 is in a vehicle when it is turned-on at a location which is identical to a location at which the navigation device 620 was shut-down. In other words, the navigation device is operated to enter an operational state from a lower-power state. This may indicate that the navigation device 620 is in a vehicle which was parked, the navigation device 620 shut-down and then turned-on at the same location in advance of the vehicle commencing a journey. In addition, the parking notification module 490 may support this by determining that the navigation device 620 previously traveled to the power-off/power-on location at greater than a predetermined speed, for example 20 kmh$^{-1}$, prior to being shut-down. Advantageously, this rules out situations where the navigation device is being carried by a person rather than in a vehicle. FIG. 9 shows a method 900 according to this embodiment of the invention. The method 900 starts in step 910. In step 920 the parking notification module 490 determines when the navigation device begins to move following a power-on of the navigation device 200. This may be determined when a speed of movement of the navigation device 200 exceeds a predetermined speed following the navigation device 200 entering an operational mode. In step 930, the parking notification module 490 determines whether the power-on location is substantially the same as the power-off location. If the two locations differ by more than a predetermined amount then the method ends in step 960. However, if the two locations are substantially the same then the method moves to step 940, wherein the parking notification module 490 checks whether a pre-power-off speed was greater than a predetermined value. For example, whether within a predetermined time before power-off e.g. 20 seconds, although other time periods may be used, the navigation device 200 traveled at greater than a predetermined speed e.g. 20 kmh$^{-1}$ or 30 kmh$^{-1}$. This may be determined from information stored in the memory 230 such as journey information indicating a location of the navigation device at predetermined time intervals. If the determination in step 940 is yes, then the method moves to step 950, otherwise the method ends in step 960. In step 950 a parking place available message 625, 725, 825 is transmitted to a server 610, 710, 810 and/or one or more navigation devices 631, 731, 831. The parking place available message indicates a location of the available parking place and may also indicate the time that the parking place became available i.e. that the vehicle left the parking place.

In another embodiment, the parking notification module 490 is arranged to compare the current location of the navigation device 620 against stored map data to determine that its current location is in a parking area. FIG. 10 illustrates a method 1000 according to this embodiment of the invention which begins in step 1010. In step 1020 the parking place notification module 490 determines when the navigation device 200 begins to move following a power-on of the navigation device 200. This may be determined when a speed of movement of the navigation device 200 exceeds a predetermined speed e.g. 20 kmh$^{-1}$ following the navigation device 200 entering an operational mode. In step 930 the parking notification module 490 determines whether the stationary location, i.e. the location at which the navigation device 200 was powered-on or entered the operational mode, corresponds to a parking location. A parking location is a publicly available parking location such as a legal roadside parking location or public car park. This may be determined by the parking notification module 490 with respect to map data stored in the memory 230. If it is determined that the stationary location is a public parking location in step 1030 then the method may move to optional step 1040 or step 1050. However, if the stationary location is not a public parking location then the method ends in step 1060. Optional step 1040 will be described in detail below. In step 1050 the parking notification module 490 is arranged to transmit a parking place available message 625, 725, 825 indicating that a parking place has become available. The message 625, 725, 825 indicates a location of the available parking place, and may also indicate a time at which the parking place became available.

In optional step 1040 the parking place notification module 490 utilises further information to determine that the navigation device 200 is present in a vehicle which has been parked, as opposed to, for example, being in a vehicle which merely temporarily stopped in traffic, or is being carried by a person rather than in a vehicle. It will be realised that an equivalent optional step may also be included in the method 900 shown in FIG. 9.

To determine that the navigation device 200 is present in a previously parked vehicle, the parking notification module 490 may determine when the navigation device 620 is supplied with power from an external source, indicating that it is mounted in a vehicle. In a further embodiment of step 1040, the parking notification module 490 is arranged to determine when a route has been planned on the navigation device 620 by a user and the navigation device 200 travels away from the location at which the route was planned by greater than a predetermined speed, such as 20 kmh$^{-1}$, indicating that it is in a vehicle which has commenced a journey. In a still further embodiment of step 1040, parking notification module 490 is arranged to determine that the navigation device 620 is in a vehicle when it is able to communicate with an electronic system of the vehicle, such as a Bluetooth audio device of the vehicle, or an information bus, e.g. CAN bus, of the vehicle. In the latter case, the parking notification module 490 may determine that the navigation device 200 is located in a parked vehicle from information received over the CAN bus, such as information indicative of engine start/stop, doors locked/unlocked, handbrake on/off etc. Such information may be useful in discriminating when the vehicle is parked or is simply stopped waiting e.g. in traffic or at traffic lights, a bridge, etc. In a further embodiment, audio data received from a microphone 220 of the navigation device 200 is analysed to determine when the navigation device is located in a vehicle having a running engine. Any of the above embodiments may be combined to increase a confidence level of determining when the navigation device 620 is in a vehicle. Advantageously, the parking notification module 490 determining that the navigation device 200 is leaving, or has left, the parking space allows the availability of parking spaces which are not equipped with physical sensors to determine the presence of a vehicle in that parking space to be notified to users. In another embodiment of step 1040, the navigation device 620 may comprise means, such as a pressure switch, to detect when it is docked to the arm 292 of the docking station, indicating that it is mounted to a vehicle windscreen.

Figure 11:
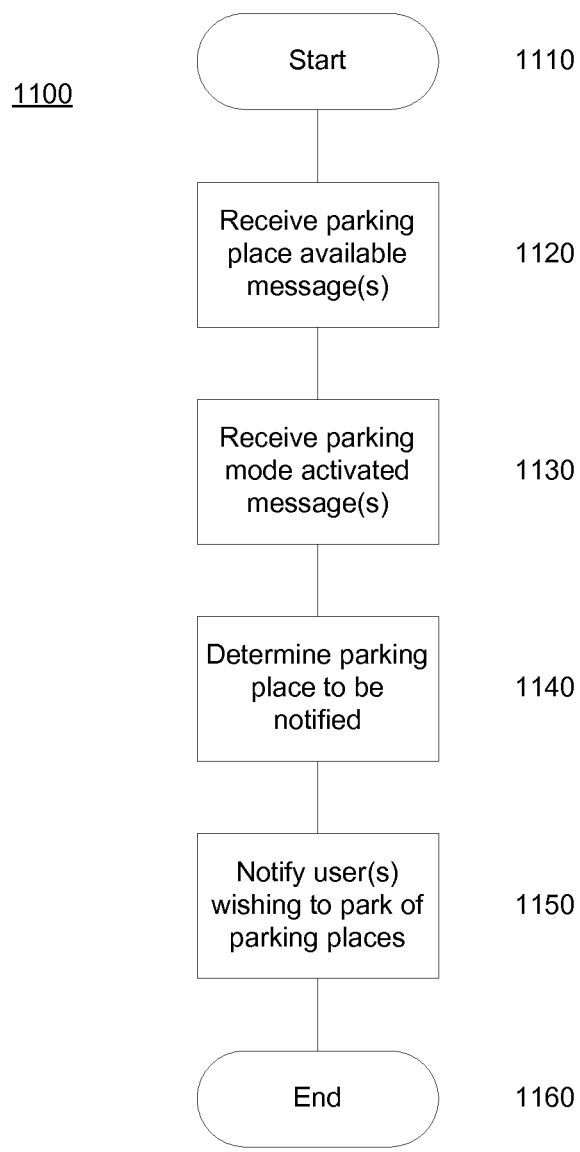
FIG. 11 is method according another embodiment of the present invention.

FIG. 11 shows a method according to a further embodiment of the present invention in which a user operates a navigation device 200 to respond to parking place available messages 630, 730, 830. In this embodiment, a user wishing to park activates a parking mode on the navigation device 200. In response, the parking place notification module 490 of the navigation device 200 notifies a server 610, 710, 810 of the parking mode being activated, signalling the user of the navigation device's intention to park, by sending a parking request message to the server 610, 710, 810 including a current location of the navigation device 200. The server 610, 710, 810 is arranged to receive parking place available messages from navigation devices 200, as in previously described embodiments. However, in this embodiment, the server 610, 710, 810 is arranged to select a parking place to be notified to the navigation device 200 of the user wishing to park. That is, the server 610, 710, 810 selectively notifies one or more navigation devices 200 of available parking places, thus not all navigation devices 200 are notified of every parking place. The server 610, 710, 810 selects the parking place to be notified to avoid a number of vehicles converging on a single parking place. That is, the server 610, 710, 810 is arranged to select the parking place to be notified such that vehicles wishing to park in a geographical area are distributed over available parking places. The method begins in step 1110 and in step 1120 the server 610, 710, 810 receives a parking place available message 625, 725, 825 from a navigation device 200 leaving a parking place. In step 1130, the server 610, 710, 810 receives a parking request message from another navigation device 200 whose user wishes to park. In step 1140 the server 610, 710, 810 determines whether any navigation devices 200 are to be notified of the available parking place. A navigation device 200 is notified of the available parking place if it is within a predetermined distance of the parking place. If a number of navigation devices 200 within the predetermined distance of the parking place have sent parking place request messages to the server 610, 710, 810, the server 302 may only notify a sub-set, i.e. less than a predetermined number determined on a first-come-first served basis, of those navigation devices 200 in order to prevent too many vehicles arriving at the parking place. The method ends in step 1160.

Figure 12:
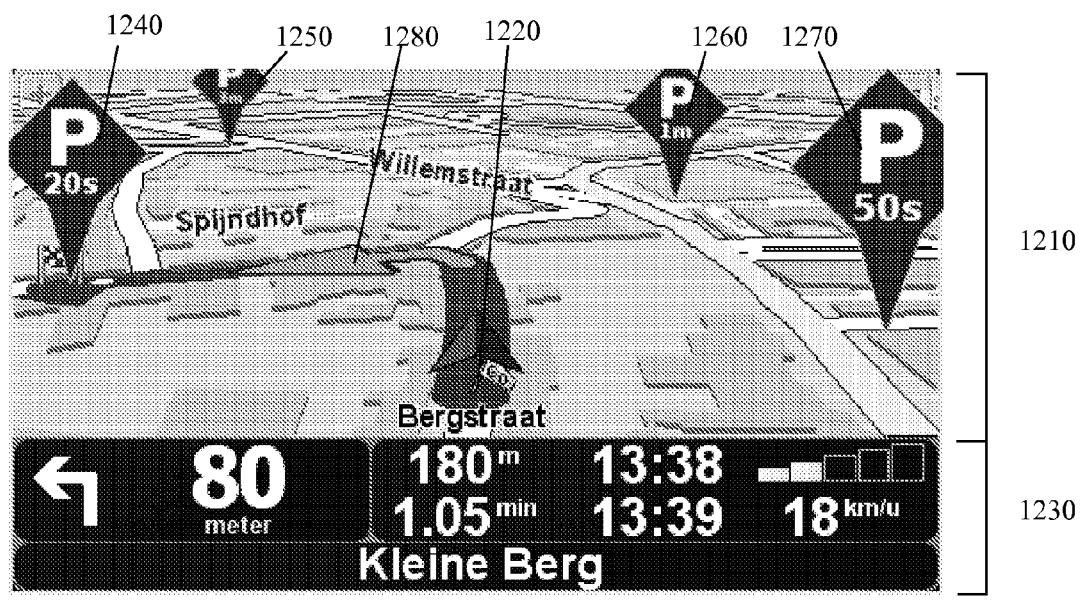
FIG. 12 is an example screenshot taken from a display of a navigation device according to an embodiment of the present invention.

Referring to FIG. 12, a display device 240 screenshot of a of a navigation device 200 operative in a parking mode to display indications of available parking places is shown. In the parking mode, the parking place notification module 490 is arranged to display on the display device 240 map information 1210 which is representative of the current location of the device 200. An icon 1220 denotes the current location of the navigation device 200, and is centred with the map information 1210 of current and surrounding roads in the vicinity of the current device location and other map features also being displayed. Navigation information 1230 is displayed in a status bar below the displayed map information. The navigation information 1230 includes a distance to the next deviation from the current road required to be taken by the user, an icon suggestive of the particular type of deviation, for example a left or right turn, a name of the current road and various other information relating to the current journey and an indication of a strength of satellite-broadcast signals being received by the navigation device 200. The display 240 further indicates, using a plurality of symbols 1240, 1250, 1260, 1270, a location of available parking places in the vicinity of the current location of the navigation device 200. Each symbol 1240, 1250, 1260, 1270 comprises an indication that it is notifying the availability of a parking place, which in the example is provided by a letter P, and an indication of the time since that parking place became available. In FIG. 12 the indication of the time since that parking place became available is provided by means of a textual label identifying a period of time since that parking place became available. However, it is envisaged that this indication may be provided in other ways, such as by varying a colour of the symbol. For example, parking places which recently became available may be indicated in a green colour which fades or changes to a red colour as time elapses. The indication of the time since that parking place became available is useful to assist the user establishing how likely that parking place is still to be available. Symbols indicating the availability of parking places may be removed from the display 240 after a predetermined time to prevent the display from becoming cluttered and because it may be assumed that the parking place would no longer be available.

The predetermined time may depend upon the current location of the navigation device. For example, in a city the predetermined time may be relatively low, such as 5 minutes, whereas in small town the predetermined time may be higher, such as 10 or 15 minutes. As further shown in FIG. 12, the display provides visual instructions 1280 to guide the user along a route to one of the available parking places 1240. The available parking place 1240 to which the route has been planned may be automatically determined by the parking notification module 490, or may be selected by the user by appropriate user input being received, such as a touch being received on the display device 240 selecting one of the displayed parking notifications 1240, 1250, 1260, 1270.

It will be apparent from the foregoing that the teachings of the present invention provide an arrangement whereby a user is provided information concerning recently vacated parking spaces, and/or automatically directed to an available parking place.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A portable device, comprising:
    a processor;
    a location determining device to determine a geographical location of the device; and
    a communication device to wirelessly transmit data;
    the processor being arranged to determine when the portable device is located in a vehicle which has vacated a parking place by determining when a location of the portable device begins to change from a stationary location at more than a first predetermined non-zero rate within a predetermined distance from the stationary location; and in response to determining that the portable device is located in a vehicle which has vacated a parking place, transmit a message via the communication device indicating a location of the parking place and a parking group identifier, the parking group identifier indicating that information about the parking place is only to be forwarded to members of a specified group.

2. The portable device of claim 1, wherein the processor is arranged to determine when the portable device is located in the vehicle which has vacated the parking place when a location of the portable device begins to change at more than the first non-zero predetermined rate from a stationary location at which the portable device entered a low-power state from an operational state and then re-entered the operational state.

3. The portable device of claim 1, wherein the processor is arranged to determine when the portable device is located in a vehicle which has vacated the parking place when the stationary location is identified in map data stored in a memory as a parking location.

4. The portable device of claim 1, wherein the processor is arranged to determine when the portable device is located in a vehicle which has vacated the parking place according, at least partly, to at least one of an indication that the portable device is held upon a support within the vehicle and information received from the vehicle indicating a status of one or more sub-systems of the vehicle.

5. The portable device of claim 1, wherein the portable device is arranged to transmit the message indicating the location of the vacated parking place comprising time information indicating a time at which the vehicle vacated the parking place.

6. The portable device of claim 1, wherein the portable device is a navigation device comprising a parking place notification module arranged to determine when the navigation device is located in the vehicle which vacates the car parking place and, in response to determining that the navigation device is located in the vehicle which has vacated a parking place, to transmit the message indicating a location of the parking place via the communication device.

7. The navigation device of claim 6, wherein the parking place notification module is arranged to determine that the parking place is a specified parking place and to transmit the message containing the parking group identifier.

8. The portable device of claim 1, wherein the processor is further arranged to determine whether a distance between a location where the portable device is powered-off and a location where the portable device is powered-on again is less than a predetermined amount.

9. The portable device of claim 1, wherein said predetermined non-zero rate and said predetermined distance are selected to permit distinction between the portable device being carried by a person and within a vehicle.

10. A method for use in a portable navigation device, comprising:
   determining when a vehicle in which the navigation device is located vacates a parking place by determining when a location of the device begins to change from a stationary location at more than a first predetermined non-zero rate within a predetermined distance from the stationary location; and
   in response to determining that the device is located in a vehicle which has vacated a parking place, wirelessly transmitting a parking place available message indicating a location of the parking place and a parking group identifier, the parking group identifier indicating that information about the parking place is only to be forwarded to members of a specified group.

11. The method of claim 10, wherein the determining when the vehicle vacates a parking place is based, at least in part, on a determination that the navigation device entered a low-power state from an operational state and then re-entered the operational state at the stationary location.

12. The method of claim 10, further comprising:
   determining whether the location of the parking place corresponds to a location of a parking place according to map data stored in a memory.

13. The method of claim 10, wherein the message indicating the location of the vacated parking place comprises time information indicating a time at which the vehicle vacated the parking place.

14. The method of claim 10, the method further comprising:
   determining whether a distance between a location where the device is powered-off and a location where the device is powered-on again is less than a predetermined amount.

15. The method of claim 10, wherein said predetermined non-zero rate and said predetermined distance are selected to permit distinction between the portable device being carried by a person and within a vehicle.

* * * * *